United States Patent
Jeong et al.

(10) Patent No.: US 12,092,207 B2
(45) Date of Patent: Sep. 17, 2024

(54) APPARATUS AND METHOD FOR CONTROLLING VEHICLE

(71) Applicants: HYUNDAI MOTOR COMPANY, Seoul (KR); KIA CORPORATION, Seoul (KR)

(72) Inventors: Sunghwa Jeong, Suwon-si (KR); Hoegab Kim, Ansan-si (KR); Ho Young Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/231,989

(22) Filed: Aug. 9, 2023

(65) Prior Publication Data
US 2024/0141986 A1    May 2, 2024

(30) Foreign Application Priority Data

Oct. 28, 2022 (KR) .......................... 10-2022-0141167

(51) Int. Cl.
*F16H 61/14* (2006.01)

(52) U.S. Cl.
CPC ..... *F16H 61/143* (2013.01); *F16H 2061/145* (2013.01)

(58) Field of Classification Search
CPC .................. F16H 61/662; F16H 61/14; B60W 30/18072; B60W 10/107
See application file for complete search history.

(56) References Cited

U.S. PATENT DOCUMENTS

| | | | |
|---|---|---|---|
| 6,397,703 B1 * | 6/2002 | Iijima | F16H 61/143 192/3.3 |
| 10,787,161 B2 * | 9/2020 | Akiyoshi | B60W 10/182 |

FOREIGN PATENT DOCUMENTS

JP    2022010683 A  *  1/2022

OTHER PUBLICATIONS

JP 2022010683 A (Year: 2022).*

* cited by examiner

*Primary Examiner* — Derek D Knight
(74) *Attorney, Agent, or Firm* — MCDONNELL BOEHNEN HULBERT & BERGHOFF LLP

(57) ABSTRACT

An apparatus for controlling a vehicle includes an engine including at least one combustion chamber configured to generate power for driving the vehicle by combustion of fuel, a torque converter including an impeller, a turbine, and a damper clutch and configured to convert torque output from the engine through an operation fluid, a continuously variable transmission including a driving pulley, a driven pulley, and a belt, a forward clutch configured to selectively block power delivery between the torque converter and the continuously variable transmission, and a controller configured to perform a slip control of the forward clutch while the vehicle is coasting, re-inject fuel into the combustion chamber of the engine when a fuel re-injection condition is satisfied, release engagement of the damper clutch after performing a slip control of the damper clutch of the torque converter, and fully engage the forward clutch.

13 Claims, 3 Drawing Sheets

APPARATUS AND METHOD FOR CONTROLLING VEHICLE

CROSS REFERENCE TO RELATED APPLICATIONS

This application claims priority to and the benefit of Korean Patent Application No. 10-2022-0141167 filed in the Korean Intellectual Property Office on Oct. 28, 2022, the entire contents of which is incorporated herein by reference.

BACKGROUND

(a) Field

The present disclosure relates to an apparatus and method for controlling a vehicle. More particularly, the present disclosure relate to an apparatus and method for controlling a vehicle equipped with a continuously variable transmission.

(b) Description of the Related Art

A power transmission apparatus of a vehicle is an apparatus for transmitting power generated from an engine to driving wheels. The power transmission apparatus may be classified into a manual transmission (MT), an automatic transmission (AT), and a continuously variable transmission (CVT), and the like, depending on the shifting method.

The automatic transmission is a transmission that automatically shifts gears of a vehicle, and power transmission and torque increase are controlled by flow of fluid. The automatic transmission automatically changes gear stages according to a predetermined shift pattern depending on the degree of depressing the accelerator pedal and the speed of the vehicle.

The manual transmission is a transmission of which the gears are manually changed by a driver, in which a shifting actuator and the engine are separated by a clutch, the gear is changed by the driver, and then power delivery is continued by releasing the clutch.

The continuously variable transmission represents a transmission capable of obtaining a continuous shift ratio, and is a transmission capable of controlling a gear ratio in steps close to infinity within a given range. The continuously variable transmission is in contrast with other transmissions that may control gear ratios in only a few predetermined steps. Since the continuously variable transmission drives the engine at the most efficient rotation speed (e.g., revolutions per minute (RPM)) according to the speed of the vehicle, it is evaluated as having excellent economic efficiency.

Although the continuously variable transmission has the advantage of excellent fuel efficiency and power performance as it may freely control the pulley ratio within a set range, the noise, vibration, and harshness (NVH) is deteriorated due to an excessive increase in the rotation speed of the engine, and shift-feel is deteriorated.

In recent years, attention has been focused on a transmission applied with a control method capable of realizing shift control similar to that of an automatic transmission in a vehicle applied with a continuously variable transmission. Such a transmission is also referred to as an intelligent variable transmission (IVT). The IVT adjusts the speed ratio that mimics the shift feeling of an automatic transmission (AT), and durability may be improved by applying a chain belt to a pulley.

The above information disclosed in this Background section is only for enhancement of understanding of the background of the disclosure, and therefore it may contain information that does not form the prior art that is already known in this country to a person of ordinary skill in the art.

SUMMARY

The present disclosure attempts to provide a method and apparatus for controlling a vehicle capable of preventing an impact or jerk of the vehicle generated when fuel is re-injected into an engine.

An apparatus for controlling a vehicle may include an engine including at least one combustion chamber configured to generate power for driving the vehicle by combustion of fuel, a torque converter including an impeller, a turbine, and a damper clutch and configured to convert torque output from the engine through an operation fluid, a continuously variable transmission including a driving pulley, a driven pulley, and a belt, a forward clutch configured to selectively block power delivery between the torque converter and the continuously variable transmission, and a controller configured to perform a slip control of the forward clutch while the vehicle is coasting, re-inject fuel into the combustion chamber of the engine when a fuel re-injection condition is satisfied, release engagement of the damper clutch after performing a slip control of the damper clutch of the torque converter, and fully engage the forward clutch.

The controller may be configured to perform the slip control of the forward clutch when a slip control condition for performing the slip control of the forward clutch while the vehicle is coasting is satisfied.

The slip control condition may be determined based on a deceleration of the vehicle, a temperature of a transmission fluid, and a coolant temperature.

The slip control condition may be satisfied when the deceleration of the vehicle is smaller than or equal to a predetermined deceleration, a temperature of the transmission fluid is greater than or equal to a predetermined oil temperature, and the coolant temperature is greater than or equal to a predetermined coolant temperature.

The re-injection condition may be satisfied when an acceleration intention of a driver is detected by an accelerator pedal sensor, or when a vehicle speed reaches a predetermined vehicle speed.

The controller may be configured to perform the slip control of the forward clutch until a target slip speed is reached.

The controller may be configured to adjust the slip control of the forward clutch based on a target time required until reaching the target slip speed, and an actual time required until reaching the target slip speed.

A method for controlling the vehicle, in which an engine, a torque converter including a damper clutch, a forward clutch, and a continuously variable transmission are sequentially disposed, may include performing, by a controller, a slip control of the forward clutch while the vehicle is coasting, re-injecting, by the controller, fuel into the combustion chamber of the engine when a fuel re-injection condition is satisfied, and performing, by the controller, a slip control of the damper clutch of the torque converter after the fuel is re-injected.

The slip control of the forward clutch may be performed by the controller, when a slip control condition for the slip control of the forward clutch is satisfied.

The slip control condition may be determined based on a deceleration of the vehicle, a temperature of a transmission fluid, and a coolant temperature.

The slip control condition may be satisfied when the deceleration of the vehicle is smaller than or equal to a predetermined deceleration, a temperature of the transmission fluid is greater than or equal to a predetermined oil temperature, and the coolant temperature is greater than or equal to a predetermined coolant temperature.

The re-injection condition may be satisfied when an acceleration intention of the driver is detected by an accelerator pedal sensor, or when a vehicle speed reaches a predetermined vehicle speed.

The method may further include terminating the slip control of the damper clutch and releasing the damper clutch, by the controller, when a slip speed of the forward clutch reaches a target slip speed after the fuel is re-injected, and fully engaging, by the controller, the forward clutch after the damper clutch is released.

According to a method and apparatus for controlling a vehicle according to an exemplary embodiment, an impact or jerk of a vehicle generated when fuel is re-injected into an engine of the vehicle while the vehicle is coasting may be prevented.

BRIEF DESCRIPTION OF THE FIGURES

These drawings are for reference only in describing embodiments of the present disclosure, and therefore the technical idea of the present disclosure should not be limited to the accompanying drawings.

DETAILED DESCRIPTION

Figure 1:
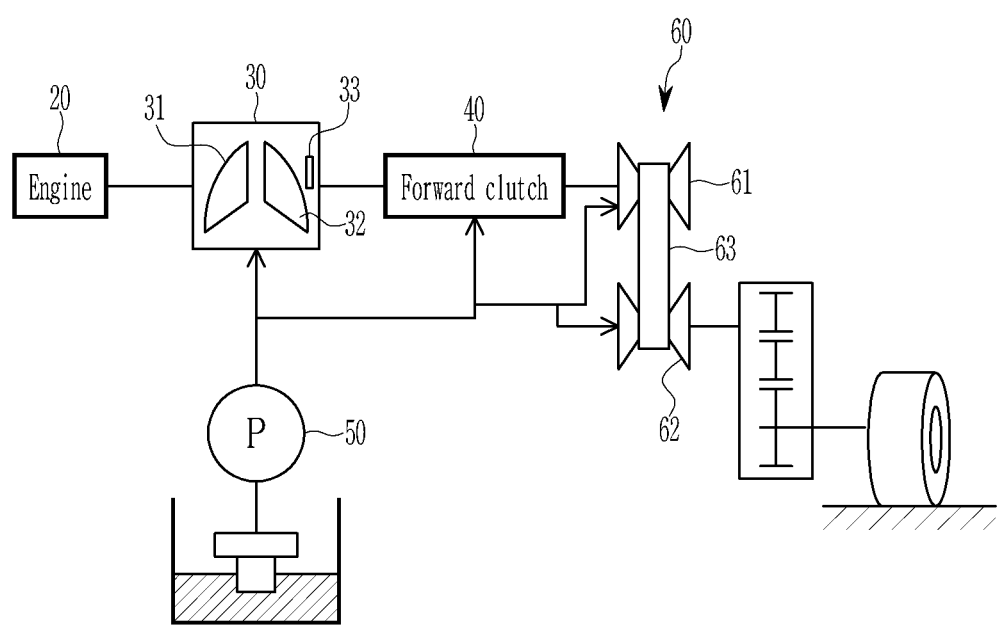
FIG. 1 is a schematic view showing a configuration of an apparatus for controlling a transmission according to an exemplary embodiment.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

The terms "module" and "unit" for components used in the following description are used only in order to make the specification easier. Therefore, these terms do not have meanings or roles that distinguish them from each other by themselves.

In describing embodiments of the present specification, when it is determined that a detailed description of the well-known art associated with the present disclosure may obscure the gist of the present disclosure, it will be omitted.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not interpreted as limiting these components.

As used herein, the singular forms "a", "an" and "the" are intended to include the plural forms as well, unless the context clearly indicates otherwise.

The terms are only used to differentiate one component from others.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

Hereinafter, an apparatus for controlling a transmission according to an exemplary embodiment is described in detail with reference to the drawings.

FIG. 1 is a schematic view showing a configuration of an apparatus for controlling a transmission according to an exemplary embodiment. In addition, FIG. 2 is a block diagram showing a configuration of an apparatus for controlling a transmission according to an exemplary embodiment.

Figure 2:
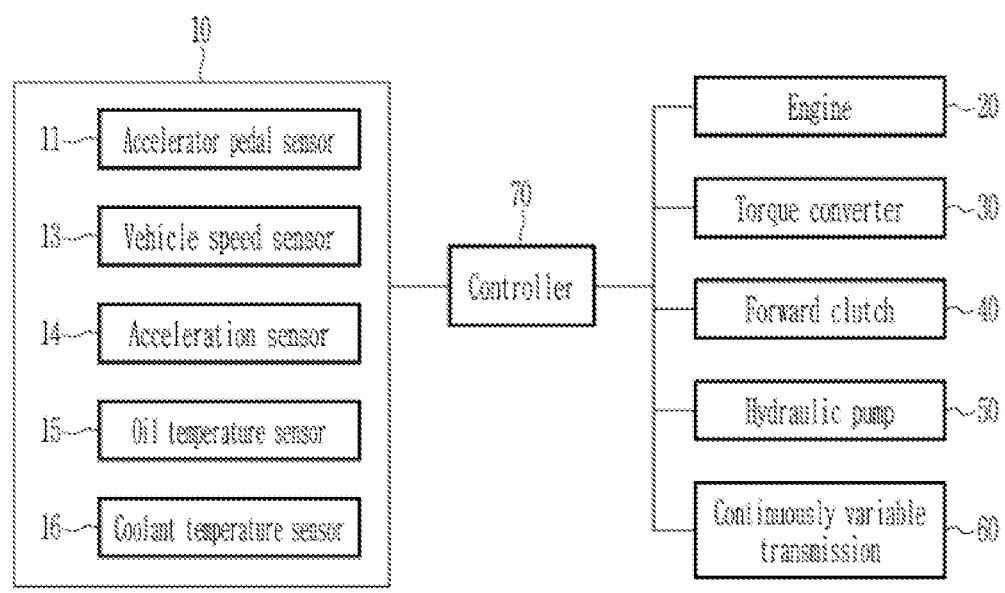
FIG. 2 is a block diagram showing a configuration of an apparatus for controlling a transmission according to an exemplary embodiment.

As shown in FIG. 1 and FIG. 2, an apparatus for controlling a vehicle according to an exemplary embodiment may include an engine 20, a torque converter 30, a forward clutch 40, a continuously variable transmission 60, and a controller 70.

The engine 20 includes at least one combustion chamber configured to generate power required for driving the vehicle by combustion of fuel. Power generated in the combustion chamber of the engine 20 is supplied to the continuously variable transmission 60 through the torque converter 30. A throttle valve is disposed at an upstream side of the combustion chamber of the engine 20 (e.g., at a front end of the intake manifold), and an amount of air supplied to the combustion chamber of the engine 20 is adjusted by an opening amount of the throttle valve.

The torque converter 30 converts torque generated in the engine 20 through an operation fluid (e.g., transmission oil) and supplies it to the continuously variable transmission 60. To this end, the torque converter 30 includes an impeller 31, a turbine 32, and a damper clutch 33 provided inside a front cover.

The impeller 31 rotates by being mechanically coupled to a flywheel of the engine 20, and the turbine 32 rotates by the flow of the operation fluid when the impeller 31 rotates. The damper clutch 33 (or lock-up clutch) is disposed between the front cover and the turbine 32, and selectively engaged above a specific speed to directly supply the torque of the engine 20 to the continuously variable transmission 60 do. That is, when the damper clutch 33 is coupled to the front cover, the engine 20 and the continuously variable transmission 60 are directly connected, such that the power of the engine 20 is directly transmitted to the continuously variable transmission 60 without power loss due to the operation fluid.

The forward clutch 40 is disposed between the torque converter 30 and the continuously variable transmission 60, and configured to selectively block power delivery between the torque converter 30 and the continuously variable transmission 60.

The continuously variable transmission 60 may include a driving pulley 61, a driven pulley 62, and a belt 63 connecting the driving pulley 61 and the driven pulley 62 to transmit power. The drive pulley 61 is connected to the forward clutch 40, and the driven pulley 62 is connected to the driving wheel of the vehicle.

In the continuously variable transmission 60, the driving pulley 61 and the driven pulley 62 move in an axial direction by adjusting hydraulic pressure (e.g., pressure of the transmission fluid) applied to the driving pulley 61 and the driven pulley 62, and thereby the diameter of the contact surface between the belt 63 and each pulley changes, through which the speed ratio may be continuously changed.

The controller 70 may control operations of the engine 20, the torque converter 30, the forward clutch 40, and the continuously variable transmission 60. That is, the controller 70 may be an electronic control unit (ECU), and may be configured to control the entire operation of the vehicle. The controller 70 may be, for example, one or more microprocessors operated by a program (control logic) or hardware (e.g., a microcomputer) including the microprocessor, and the program may include a series of instructions for performing a method for controlling a vehicle according to an exemplary embodiment. The instructions may be stored in a memory of an apparatus for controlling a vehicle or the controller 70.

Meanwhile, a vehicle control device according to an embodiment of the present disclosure includes a data detector 10, and the data detector 10 detects information required for driving for vehicle and transmits it to the controller 70. For this purpose, the data detector 10 may include an accelerator pedal sensor 11 configured to detect a position value of an accelerator pedal, a vehicle speed sensor 13 configured to detect a vehicle speed, an acceleration sensor 14 configured to detect a deceleration of the vehicle, an oil temperature sensor 15 configured to detect a temperature of the transmission fluid, and a coolant temperature sensor 16 configured to detect a coolant temperature.

Hereinafter, an operation of an ignition apparatus according to an embodiment is described in detail with reference to the drawings.

Figure 3:
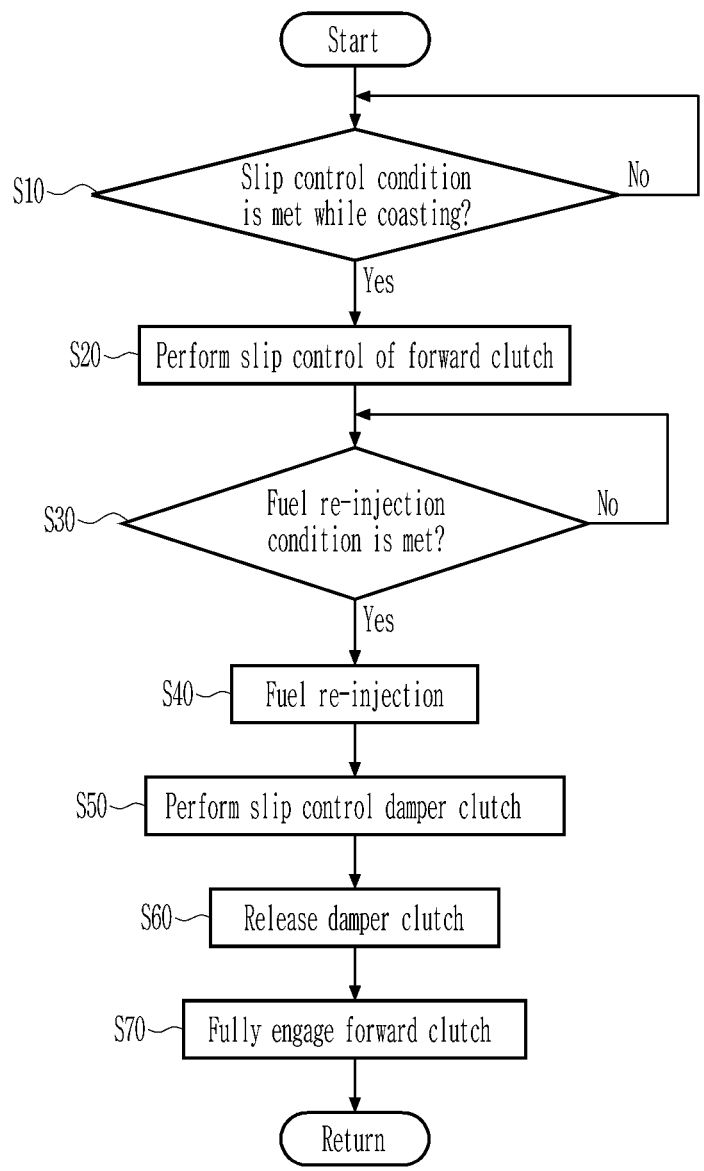
FIG. 3 is a flowchart showing a method for controlling a transmission according to an exemplary embodiment.

FIG. 3 is a flowchart showing a method for controlling a transmission according to an exemplary embodiment.

Referring to FIG. 3, at step S10, the controller 70 determines whether a slip control condition for performing a slip control of the forward clutch 40 is satisfied while the vehicle is coasting.

The slip control condition is determined based on the deceleration of the vehicle, the temperature of the transmission fluid, the coolant temperature of the engine 20. Specifically, the slip control condition may be satisfied when the deceleration of the vehicle is smaller than or equal to a predetermined deceleration (e.g., −3 g), the temperature of the transmission fluid is greater than or equal to a predetermined oil temperature (e.g., 10 degrees Celsius), and the coolant temperature is greater than or equal to a predetermined coolant temperature (e.g., 35 degrees Celsius).

When the slip control condition is satisfied, the controller 70 performs the slip control of the forward clutch 40, at step S20. That is, the controller 70 controls the forward clutch 40 to be slip-engaged by adjusting level of hydraulic pressure of the operation fluid applied from a hydraulic pump 50 to the forward clutch 40.

The slip control of the forward clutch 40 means a slip occurring between the forward clutch 40 and the driving pulley 61 of the continuously variable transmission 60, which may mean an engagement state of the forward clutch 40 in which friction occurs between the forward clutch 40 and the driving pulley 61 of the continuously variable transmission 60 and a speed difference between both ends of the forward clutch 40 is above a predetermined speed. At this time, the controller 70 may perform the slip control of the forward clutch 40 until a slip speed of the forward clutch 40 reaches a target slip speed (e.g., RPM). For example, the target slip speed may be determined between 50 RPM and 100 RPM and, if necessary, may be determined through experiments. The controller 70 performs feedforward control through the predetermined hydraulic pressure control map until the target slip speed is reached, and performs feedback control when the target slip speed is reached.

In the process of performing the slip control of the forward clutch 40, the controller 70 may adjust the slip control of the forward clutch 40 based on a target time required until reaching the target slip speed, and an actual time required until reaching the target slip speed.

For example, when an actual speed is smaller than a target speed, the controller 70 determines that the level of the pressure of the operation fluid applied from the hydraulic pump 50 to the forward clutch 40 is larger than that in the normal state, and decreases the level of the pressure of the operation fluid applied to the forward clutch 40. To the contrary, when the actual speed is larger than the target speed, the controller 70 determines that the level of the pressure of the operation fluid applied from the hydraulic pump 50 to the forward clutch 40 is smaller than that in the normal state, and increases the level of the pressure of the operation fluid applied to the forward clutch 40. By adjusting the slip control in this way, it is possible to compensate the deviation of the target speed caused by the deviation of parts.

At step S30, the controller 70 determines whether a fuel re-injection condition satisfied when the slip control of the forward clutch 40 is performed. The fuel re-injection condition may be satisfied when an acceleration intention of the driver is detected by the accelerator pedal sensor 11 (e.g., when the accelerator pedal sensor 11 is pressed), or when the vehicle speed from the vehicle speed sensor 13 has gradually decreased to reach a predetermined speed (e.g., 15 kph).

When the fuel re-injection condition is satisfied, the controller 70 re-injects fuel into the combustion chamber of the engine 20, at step S40.

When fuel is re-injected into the combustion chamber of the engine 20, the controller 70 performs slip control of the damper clutch 33 of the torque converter 30, at step S50. The slip control of the damper clutch 33 may mean controlling the damper clutch 33 to be slip-coupled to the inner surface of the front cover.

When the slip speed of the forward clutch 40 reaches the target slip speed, the controller 70 terminates the slip control of the damper clutch 33 and releases engagement of the damper clutch 33, at step S60. At this time, the controller 70 may rapidly release the pressure of the operation fluid applied from the hydraulic pump 50 to the damper clutch 33. That is, by rapidly releasing the pressure of the operation fluid applied from the oil pump 50 to the damper clutch 33 to release the engagement of the damper clutch 33, side effects such as turning off of the engine may be prevented when the vehicle rapidly decelerates.

When the engagement of the damper clutch 33 is released, the controller 70 terminates the slip control of the forward clutch 40 and controls the forward clutch 40 to be fully engaged, at step S70. That is, it is possible to control the forward clutch 40 to be fully engaged by increasing the hydraulic pressure of the operation fluid applied to the forward clutch 40.

According to the embodiment of the present disclosure as described above, slip control of the forward clutch 40 may be performed when fuel is re-injected into the combustion chamber of the engine 20 while the vehicle is coasting, and therefore an impact or jerk possibly generated by fuel re-injection may be prevented.

As such, since an impact or jerk possibly generated by fuel re-injection may be prevented, a fast injection in which fuel is simultaneously injected into all cylinders may be performed in the fuel re-injection. Through this, it is possible to secure fast responsiveness of torque of the engine 20.

According to an apparatus for controlling a vehicle according to an exemplary embodiment and method, while the vehicle is coasting, since the forward clutch 40 is slip-controlled before a fuel re-injection time point and the damper clutch 33 of the torque converter 30 is slip-controlled after the fuel re-injection time point, jerking phenomena of the vehicle occurring due to instant torque change caused by the fuel re-injection may be prevented.

The constituent elements or "-unit" or "-group" or a block or module used in the embodiment of the present disclosure can be implemented as tasks, classes, subroutines, processes, objects, execution threads, software such as a program, or hardware such as a field-programmable gate array (FPGA) or an application-specific integrated circuit (ASIC), or a combination of the software and hardware. The constituent elements or "-unit" may be included in a computer-readable storage medium, or a part thereof may be dispersed and distributed in a plurality of computers.

As above, the embodiment was disclosed in drawings and the specification. Here, although specific terms have been used, these are only used for the purpose of describing the present disclosure and are not to be used to limit the meaning or range of the present disclosure described in the claims range. Therefore, a person of ordinary skill in this technical field will be able to understand that numerous variations and equivalent embodiments are possible from the present disclosure. Therefore, the true technical protection range of this disclosure should be determined by the technical idea of the appended claims range.

The invention claimed is:

1. An apparatus for controlling a vehicle, the apparatus comprising:
an engine comprising at least one combustion chamber configured to generate power for driving the vehicle by combustion of fuel;
a torque converter comprising an impeller, a turbine, and a damper clutch, the torque converter being configured to convert torque output from the engine through an operation fluid;
a continuously variable transmission comprising a driving pulley, a driven pulley, and a belt;
a forward clutch configured to selectively block power delivery between the torque converter and the continuously variable transmission; and
a controller configured to perform a slip control of the forward clutch while the vehicle is coasting, re-inject fuel into the combustion chamber of the engine when a fuel re-injection condition is satisfied, release engagement of the damper clutch after performing a slip control of the damper clutch of the torque converter, and fully engage the forward clutch.

2. The apparatus of claim 1, wherein:
the controller is configured to perform the slip control of the forward clutch when a slip control condition for performing the slip control of the forward clutch while the vehicle is coasting is satisfied.

3. The apparatus of claim 2, wherein the slip control condition is determined based on a deceleration of the vehicle, a temperature of a transmission fluid, and a coolant temperature.

4. The apparatus of claim 3, wherein the slip control condition is satisfied when the deceleration of the vehicle is smaller than or equal to a predetermined deceleration, a temperature of the transmission fluid is greater than or equal to a predetermined oil temperature, and the coolant temperature is greater than or equal to a predetermined coolant temperature.

5. The apparatus of claim 1, wherein the re-injection condition is satisfied when an acceleration intention of a driver is detected by an accelerator pedal sensor, or when a vehicle speed reaches a predetermined vehicle speed.

6. The apparatus of claim 1, wherein the controller is configured to perform the slip control of the forward clutch until a target slip speed is reached.

7. The apparatus of claim 6, wherein the controller is configured to adjust the slip control of the forward clutch based on a target time required until reaching the target slip speed, and an actual time required until reaching the target slip speed.

8. A method for controlling the vehicle in which an engine, a torque converter comprising a damper clutch, a forward clutch, and a continuously variable transmission are sequentially positioned, the method comprising:
performing, by a controller, a slip control of the forward clutch while the vehicle is coasting;
re-injecting, by the controller, fuel into the combustion chamber of the engine when a fuel re-injection condition is satisfied; and
performing, by the controller, a slip control of the damper clutch of the torque converter after the fuel is re-injected.

9. The method of claim 8, wherein the slip control of the forward clutch is performed by the controller when a slip control condition for the slip control of the forward clutch is satisfied.

10. The method of claim 9, wherein the slip control condition is determined based on a deceleration of the vehicle, a temperature of a transmission fluid, and a coolant temperature.

11. The method of claim 10, wherein the slip control condition is satisfied when the deceleration of the vehicle is smaller than or equal to a predetermined deceleration, a temperature of the transmission fluid is greater than or equal to a predetermined oil temperature, and the coolant temperature is greater than or equal to a predetermined coolant temperature.

12. The method of claim 8, wherein the re-injection condition is satisfied when an acceleration intention of the driver is detected by an accelerator pedal sensor, or when a vehicle speed reaches a predetermined vehicle speed.

13. The method of claim 8, further comprising:
terminating the slip control of the damper clutch and releasing the damper clutch, by the controller, when a slip speed of the forward clutch reaches a target slip speed after the fuel is re-injected; and
fully engaging, by the controller, the forward clutch after the damper clutch is released.

\* \* \* \* \*